Patented Nov. 23, 1948

2,454,635

UNITED STATES PATENT OFFICE 2,454,635

MANUFACTURE OF RUBBERLIKE MATERIALS

Cecil Albert Curtis, Manchester, and Douglas Sandford Stephens, Cheadle, England No Drawing. Application August 15, 1947, Serial No. 768,934. In Great Britain September 4, 1942

Section 1, Public Law 690, August 8, 1946
Patent expires April 14, 1964

9 Claims. (Cl. 260—67)

This invention relates to the manufacture of rubber-like materials containing sulphur. It is known that plastic materials can be made by reaction between certain aldehydes and alkaline polysulphides, see, for example, United States patent specifications Nos. 2,039,206, 2,255,228, 2,012,347 and 1,890,191. However, by these known processes, products are obtained which rapidly become hard and brittle, and which, when compounded and subjected to a curing treatment, yield products which do not exhibit the properties of resilience and tensile strength required in a rubber-like product.

It is an object of the present invention to make rubber-like materials which do not harden on storage and which can be compounded and cured to yield resilient rubber-like products of good tensile strength.

According to the present invention rubber-like materials are made by reacting an aliphatic thioaldehyde with a quantity of elementary sulphur ranging from ¼ to 12 atomic proportions per atomic proportion of combined sulphur in the thioaldehyde in an aqueous medium at a temperature ranging from 80° C. to the boiling point while maintaining the pH value of the aqueous medium between 1.5 and 10 throughout the reaction.

As the aliphatic thioaldehyde there may be used thioformaldehyde or thioacetaldehyde; and the thioaldehydes may be used as such or in the form of the products obtained by the action of hydrogen sulphide on the corresponding aldehyde. By the action of hydrogen sulphide on the aldehyde the formation of products of a polymeric nature is unavoidable, but for the purposes of this invention it is desirable to keep the proportion of such products as low as possible. This may be achieved by conducting the reaction between hydrogen sulphide and the aldehyde under substantially neutral conditions, at a low temperature and in a short period of reaction.

The preparation of the thioaldehyde and the reaction thereof with elementary sulphur in accordance with the invention may be conducted as two separate stages, and the reaction mixture obtained in the first stage may be used directly for the reaction with sulphur. Alternatively, the preparation of the thioaldehyde and the reaction with sulphur may be carried out in a single operation.

It is necessary to conduct the reaction of the thioaldehyde with elementary sulphur at a pH value ranging from 1.5 to 10, because at pH values outside these limits materials are obtained which, when cured, do not yield resilient rubber-like products of good tensile strength. The desired pH value may be maintained by adding to the reaction mixture a substance of alkaline reaction, for example, trisodium phosphate, borax or zinc oxide, or a substance of acid reaction, for example, stearic acid, potassium dihydrogen phosphate or sulphuric acid.

While the proportion of elementary sulphur used in the reaction with the thioaldehyde may range from ¼ to 12 atomic proportions per atomic proportion of combined sulphur in the thioaldehyde, especially advantageous products are obtained by using 1–3 atomic proportions of elementary sulphur.

The products of the reaction between the thioaldehydes and elementary sulphur (hereinafter referred to as primary products) are elastic, soft and plastic materials which are insoluble in mineral oils and in the normal rubber solvents, except carbon disulphide. These primary products may also be obtained in the form of latex-like compositions by conducting the reaction with elementary sulphur in the presence of a substance, such as magnesium oxide, which inhibits the agglomeration of the product. Latex-like compositions may also be obtained by subsequently emulsifying the primary products.

The primary products, with or without previous purification, may be compounded and cured in a manner similar to that of natural or synthetic rubber.

According to a further feature of the invention the primary products are converted into secondary products, which are elastic materials of remarkable toughness and strength, by treatment with an acid condensing agent, such as sulphuric acid or aluminium chloride. The primary products and the secondary products are, under normal conditions, insoluble in mineral oils and in the usual rubber solvents, except carbon disulphide, in which they are slightly soluble. They also have an outstanding resistance to acids, such as strong mineral acids and even oxidising acids like nitric acid and chromic acid.

The primary and secondary products alone or in admixture with one another can be compounded and cured by themselves or together with natural or synthetic rubbers, with rubber substitutes such as factice, with sulphur or with natural or artificial resins. The compounding and curing of the primary and/or secondary products may also be conducted with the addition of a filling material; and such filling material may be added at an earlier stage in the manufacture, for example, in the reaction with elementary sulphur or in the acid condensation. To facilitate the compounding operation there may be added as a plasticiser an accelerator of the kind used in curing rubber. The compounded material may be cured by an open steam cure or a wet cure or by dry heat.

The rubber-like products obtained by compounding and curing the primary and/or secondary products are of good resilience and tensile strength.

The following examples illustrate the invention, the parts being by weight:

Example 1

164 parts of formaldehyde solution of 40 per cent. strength are neutralised with borax to a pH of 7. Hydrogen sulphide is then passed through the solution at a temperature of 15–20° C. until the specific gravity is 1.13. Instead of passing the hydrogen sulphide through the solution, the gas may be brought into intimate contact with the solution by exposing a large surface of the solution to the gas, for example, by allowing the formaldehyde solution to percolate downwards through an absorption tower filled with Raschig rings and passing a current of hydrogen sulphide through the tower in the opposite direction. The desired degree of absorption may be attained either by recirculating the solution through the tower or by passing the solution through a succession of towers. The solution takes up 42 parts of hydrogen sulphide, so that it contains 19 per cent. of combined sulphur. Its pH value is 6.5.

There are then added to the resulting solution 90 parts of finely ground sulphur and 30 parts of borax. The mixture is heated to the boil and then has a pH value of 8.6. It is refluxed in a vessel provided with stirring means until the aqueous layer has become clear and the reaction is at an end. The pH value becomes progressively lower during the reaction and is 8.0 when the endpoint is reached. The product is then isolated and washed free from mother liquor. It is an elastic greenish-yellow plastic. 145 parts of the final product are obtained which corresponds to an addition of 2.2 atomic proportions of sulphur per atomic proportion of combined sulphur in the solution treated.

Example 2

150 parts of the product obtained as described in Example 1 are heated to 100° C. in 100 parts of sulphuric acid of 97 per cent. strength, and the mixture is stirred for ½ hour at this temperature. The plastic product is isolated and washed free from acid. It then forms a tough and elastic rubber-like material.

Example 3

109 parts of formaldehyde solution of 40 per cent. strength are neutralised with borax to a pH of 7, and are then treated with hydrogen sulphide at a temperature of 15–20° C. in the manner described in Example 1. 81 parts of the solution so obtained, which contains 19 per cent. of combined sulphur, are mixed in a stirring pan with 36 parts of ground sulphur and rapidly heated to 80° C.

6 parts of trisodium phosphate are added and the mixture is brought to the boil under reflux as rapidly as possible, the pH value being 9.8 when the boil is reached. Boiling is continued for 30 minutes, during which the pH value drops to 8.6. After settling, the clear aqueous solution is decanted, and the soft product washed with hot water until it is free from the odour of formaldehyde. 58 parts of the product are obtained. The same yield is obtained when working in substantially neutral solution, i. e., without any addition of a pH regulator, the product in this case being somewhat softer. The pH value at the end of the neutral reaction is 6.3.

Example 4

660 parts of formaldehyde solution of 40 per cent. strength are neutralised with borax to pH 7. Hydrogen sulphide is then passed through the liquid whilst stirring at a temperature of 15–18° C. until saturation point is reached. The solution containing 19 per cent. of combined sulphur is filtered and 180 parts of ground sulphur and 60 parts of zinc oxide added to the filtrate. The mixture is then refluxed for 30 minutes with strong agitation, the pH being 7.4 when the boil is reached and dropping to 6.9 at the end of the refluxing.

A cream coloured suspension is thus obtained, which is then washed by decantation until free from formaldehyde. The product is then isolated by filtration with a yield of 463 parts of a soft sticky mass. By mixing this product with an emulsifying agent, such as triethanolamine-oleate, and an aqueous medium, a stable latex-like suspension is obtained.

Example 5

Hydrogen sulphide is passed through freshly prepared acetaldehyde at a temperature of 15° C. The resulting mixture of acetaldehyde vapour and hydrogen sulphide is passed over solid trisodium phosphate which is maintained at a temperature of 75–80° C., and the reaction product containing 18.3 per cent. of combined sulphur is condensed by means of a cooling mixture.

345 parts of the liquid reaction product so obtained are allowed to react with 125 parts of ground sulphur in 290 parts of water and 24 parts of zinc oxide in a closed enamelled vessel under slight pressure for 1½ hours at the temperature of the boiling water bath, the pH value being approximately 7. 290 parts of a soft elastic product are obtained having a greenish grey colour.

Example 6

164 parts of formaldehyde solution are neutralized with borax to pH 7 and saturated with hydrogen sulphide in the manner described in Example 1. 90 parts of finely ground sulphur and 0.75 part of stearic acid are added and the mixture is refluxed for 3 hours. The pH at the beginning of the reaction is 5.5, and drops to 4.76 at the end. After washing out the impurities by decantation the end product is dried by heating to 60° C. under vacuum. The dry weight is 139 parts. The product is soft and elastic and has a greenish-yellow colour.

Example 7

818 parts of thioformaldehyde solution prepared as described in Example 3 are heated together with 360 parts of sulphur, 60 parts of disodium phosphate and 60 parts of powdered white factice for 2½ hours under reflux, the pH value being 8.15 when the boil is reached and drops to 7.0 at the end of the reaction. 640 parts of a yellow opaque and elastic product are obtained.

Example 8

60 parts of zinc oxide and 18 parts of magnesium oxide are added to a mixture of 164 parts of the thioformaldehyde solution obtained as described in Example 6 and 90 parts of finely ground sulphur, and the mixture is treated under reflux for 1½ hours. The pH at the beginning of the reaction is 9 and drops to 6.5 at the end. A thick, creamy, latex-like product is obtained, of which content of suspended matter amounts to 688 parts.

Example 9

100 parts of the product obtained as described in Example 1, 2, 3, 5 or 7 are compounded with 0.1 part of diphenyl-guanidine, 0.35 part of dibenzthiazole-1:1'-disulphide, 0.5 part stearic acid, and 60 parts of carbon and 10 parts of zinc oxide, by means of moderately heated rollers. The sheets so obtained are cured in an open steam cure by heating gradually, that is to say in about 20 minutes to 135° C. and maintaining this temperature and the corresponding steam pressure for 1 hour. It is of advantage to cool down under pressure in the vulcaniser. The cured product may be moulded into articles of various shapes by heat and pressure, temperatures of 110–120° C. and pressures of 55–110 lbs. per square inch being suitable. Non-porous rubber-like articles are thus obtained.

Example 10

100 parts of the product obtained as described in Example 6 are compounded with 60 parts of carbon and 10 parts of zinc oxide by means of rollers, and the resulting sheets are subjected to a dry heat cure in a press for 1 hour at a temperature of 135° C. and a pressure of 930 lbs. per square inch. The following table shows the effect of the cure:

|  | Tensile strength at break, lbs. per square inch | Elongation at break | Shore hardness |
| --- | --- | --- | --- |
| Freshly compounded sheets | 80 | 700 | Nil |
| Cured sheets | 530 | 180 | 82/78 |

The cured product which is non-porous can be remoulded to any desired shape as described in Example 9.

Example 11

Material compounded as described in Example 9, but not cured, is rolled into very thin sheets, and the latter are calendered on to textile material at a temperature of 110° C. During the calendering, curing takes place and impermeable materials resembling oil-cloth are produced.

Example 12

Sheets compounded as described in Example 9 but not cured, are subjected to a wet cure by wrapping them into cotton cloth, and curing at 135° C. in water which is heated indirectly by a steam coil, the pressure inside the vessel rising automatically. Cooling is carried out by gradually replacing the hot water by cold water, whilst maintaining the pressure inside the vessel at about 40 lbs. per square inch. A non-porous material similar to that of Example 9 is obtained.

Example 13

The mixture described in Example 9 is compounded on moderately heated rollers, with the addition of 10 parts of sulphur powder during the compounding operation. The resulting material is cured in the manner described in Example 9, 10 or 12, and elastic materials of leather-like appearance are obtained.

Example 14

Material compounded as described in Example 10, but not cured, is extruded mechanically in a forcing machine, the barrel of which is cold while the head is slightly warmed. The hose obtained is cured on an iron rod, after spiral wrapping with wet cotton, for 30 minutes at 30 lbs./sq. inch of open steam pressure. A flexible non-porous tube is obtained.

This case is a continuation in part of application Serial No. 509,796, filed November 10, 1943, and now abandoned.

We claim:

1. A process for making rubber-like materials which comprises reacting an aliphatic thioaldehyde with a quantity of elementary sulphur ranging from ¼ to 12 atomic proportions per atomic proportion of combined sulphur in the thioaldehyde in an aqueous medium at a temperature ranging from 80° C. to the boiling point while maintaining the aqueous medium at a pH value ranging from 1.5 to 10 throughout the reaction.

2. A process for making rubber-like materials which comprises reacting an aliphatic thioaldehyde with a quantity of elementary sulphur ranging from 1 to 3 atomic proportions per atomic proportion of combined sulphur in the thioaldehyde in an aqueous medium at a temperature ranging from 80° C. to the boiling point while maintaining the aqueous medium at a pH value ranging from 1.5 to 10 throughout the reaction.

3. A process for making rubber-like materials which comprises reacting thioformaldehyde with a quantity of elementary sulphur ranging from ¼ to 12 atomic proportions per atomic proportion of combined sulphur in the thioaldehyde in an aqueous medium at a temperature ranging from 80° C. to the boiling point while maintaining the aqueous medium at a pH value ranging from 1.5 to 10 throughout the reaction.

4. A process as claimed in claim 3, wherein the quantity of elementary sulphur ranges from 1 to 3 atomic proportions per atomic proportion of combined sulphur in the thioformaldehyde.

5. A process for making rubber-like materials which comprises reacting thioacetaldehyde with a quantity of elementary sulphur ranging from ¼ to 12 atomic proportions per atomic proportion of combined sulphur in the thioaldehyde in an aqueous medium at a temperature ranging from 80° C. to the boiling point while maintaining the aqueous medium at a pH value ranging from 1.5 to 10 throughout the reaction.

6. A process as claimed in claim 5, wherein the quantity of elementary sulphur ranges from 1 to 3 atomic proportions per atomic proportion of combined sulphur in the thioacetaldehyde.

7. A process for making rubber-like materials which comprises reacting an aliphatic thioaldehyde with a quantity of elementary sulphur ranging from ¼ to 12 atomic proportions per atomic proportion of combined sulphur in the thioaldehyde in an aqueous medium at a temperature ranging from 80° C. to the boiling point while maintaining the aqueous medium at a pH value ranging from 1.5 to 10 throughout the reaction, isolating the resulting rubber-like material from the reaction mixture, and subjecting the isolated material to further condensation by means of an acid condensing agent.

8. A process for making cured rubber-like materials, which comprises reacting an aliphatic thioaldehyde with a quantity of elementary sulphur ranging from ¼ to 12 atomic proportions per atomic proportion of combined sulphur in the thioaldehyde in an aqueous medium at a temperature ranging from 80° C. to the boiling point while maintaining the aqueous medium at a pH value ranging from 1.5 to 10 throughout the reaction, isolating the resulting rubber-like material from the reaction mixture, and compounding and curing the isolated material.

9. A process for making cured rubber-like materials, which comprises reacting an aliphatic thioaldehyde with a quantity of elementary sulphur ranging from ¼ to 12 atomic proportions per atomic proportion of combined sulphur in the thioaldehyde in an aqueous medium at a temperature ranging from 80° C. to the boiling point while maintaining the aqueous medium at a pH value ranging from 1.5 to 10 throughout the reaction, isolating the resulting rubber-like material from the reaction mixture, subjecting the isolated material to further condensation by means of an acid condensing agent, and compounding and curing the resulting further condensed rubber-like material.

CECIL ALBERT CURTIS.
DOUGLAS SANDFORD STEPHENS.

No references cited.